US010956672B1

(12) United States Patent
Ben-Natan et al.

(10) Patent No.: US 10,956,672 B1
(45) Date of Patent: Mar. 23, 2021

(54) HIGH VOLUME MESSAGE CLASSIFICATION AND DISTRIBUTION

(71) Applicants: Ron Ben-Natan, Lexington, MA (US); Derek Difilippo, Lexington, MA (US); Uri Hershenhorn, Lexington, MA (US); Roman Krashanitsa, Lexington, MA (US); Luigi Labigalini, Lexington, MA (US); Ury Segal, Vancouver (CA)

(72) Inventors: Ron Ben-Natan, Lexington, MA (US); Derek Difilippo, Lexington, MA (US); Uri Hershenhorn, Lexington, MA (US); Roman Krashanitsa, Lexington, MA (US); Luigi Labigalini, Lexington, MA (US); Ury Segal, Vancouver (CA)

(73) Assignee: Imperva, Inc., San Mateo, CA (US)

( * ) Notice: Subject to any disclaimer, the term of this patent is extended or adjusted under 35 U.S.C. 154(b) by 117 days.

(21) Appl. No.: 16/225,038

(22) Filed: Dec. 19, 2018

(51) Int. Cl.
*G06F 7/00* (2006.01)
*G06F 40/284* (2020.01)
*G06F 16/28* (2019.01)
*G06N 20/20* (2019.01)
*G06F 40/216* (2020.01)
*G06F 40/242* (2020.01)

(52) U.S. Cl.
CPC .......... *G06F 40/284* (2020.01); *G06F 16/285* (2019.01); *G06F 40/216* (2020.01); *G06F 40/242* (2020.01); *G06N 20/20* (2019.01)

(58) Field of Classification Search
CPC .... G06F 40/284; G06F 40/285; G06F 40/242; G06F 40/216; G06N 20/20
See application file for complete search history.

(56) References Cited

U.S. PATENT DOCUMENTS 10,594,546 B1 *  3/2020  Davis ................... H04L 41/069
2012/0239650 A1 *  9/2012  Kim ...................... G06F 16/355
                                                            707/737

* cited by examiner

*Primary Examiner* — Azam M Cheema
(74) *Attorney, Agent, or Firm* — Armis IP Law, LLC

(57) ABSTRACT

A log message classifier employs machine learning for identifying a corresponding parser for interpreting the incoming log message and for retraining a classification logic model processing the incoming log messages. Voluminous log messages generate a large amount of data, typically in a text form. Data fields are parseable from the message by a parser that knows a format of the message. The classification logic is trained by a set of messages having a known format for defining groups of messages recognizable by a corresponding parser. The classification logic is defined by a random forest that outputs a corresponding group and confidence value for each incoming message. Groups may be split to define new groups based on a recurring matching tail (latter portion) of the incoming messages. A trend of decreased confidence scores triggers a periodic retraining of the random forest, and may also generate an alert to operators.

19 Claims, 8 Drawing Sheets

HIGH VOLUME MESSAGE CLASSIFICATION AND DISTRIBUTION

BACKGROUND

An information system typically generates log files indicative of various system functions and operations. Log files facilitate troubleshooting and remediation when problems occur, and can provide a path of performed operations. Modern information systems handling many transactions or information requests can generate substantial volumes of log file entries. Often, log files need not be consulted unless an anomaly or problem is discovered. However, it is often beneficial to maintain the log files for regulatory, legal or business practices. The result can be a substantial quantity of sparsely used data.

SUMMARY

A log message classifier employs machine learning for identifying a corresponding parser for interpreting the incoming log messages and for retraining a classification logic model for processing the incoming log messages. Voluminous log messages generate a large amount of data, typically in a text form. Data fields are parseable from the message by a parser that knows a format of the message. The classification logic is trained by a set of messages having a known format for defining groups of messages recognizable by a corresponding parser. The classification logic is implemented by a random forest or another machine learning algorithm that outputs a corresponding group and confidence value for each incoming message. The random forest is based on values of features of the log messages, including a dictionary of phrases indicative of particular formats. Groups may be split to define new groups based on a recurring matching tail (latter portion) of the incoming messages. A trend of decreased confidence scores triggers a periodic retraining of the random forest, and may also generate an alert to operators. The identified group denotes a parser that can read individual fields from the message for intake into a query and/or reporting system adapted to handle very large data sets.

Configuration herein are based, in part, on the observation that log files from an informational system such as a database management system or transactional exchange server can be voluminous. Unfortunately, conventional approaches suffer from the shortcoming that it can be problematic and time consuming to identify proper locations or entries in a log file or stream of log entries when an inquiry arises. Substantial time, resources, and searching may be required to identify relevant entries to correspond to a particular anomaly, circumstance or event. Often, this may result in brute-force text searching, which can be computationally expensive and may not generate accurate or sufficiently narrow results. In other words, a simple text search on a generic value may simply yield a slightly reduced volume of material which must be further searched.

Accordingly, configurations herein substantially overcome the above described shortcomings by providing a log message classification system, that employs machine learning to classify incoming log messages so that an appropriate parser can be invoked to interpret fields and values in the log message. Parser output can then be stored in a field/value arrangement that greatly simplifies future queries, and provides substantial improvements over a conventional text search.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Configurations below implement message classification for a stream of incoming messages of various formats. Messages are employed in subsequent queries for identifying diagnostic, troubleshooting, audit recording and performance issues associated with a database system, such as an Oracle® or Sybase® database. In a large database serving an entire enterprise, database activity can result in a substantial number of log messages. Often log messages are routine, however others can be more imperative or indicate a condition that will deteriorate if ignored. Log messages are also used for security and audit purposes such as investigations and for recording "who do what from where". Accordingly, it can be beneficial to receive and organize log messages so that subsequent inspection and reporting can identify needed remedial actions. An example message classification system and method is depicted below which receives a stream of log messages from a source, such as a data warehouse or repository, and classifies messages by a machine learning approach using a random forest as an example configuration. Alternate supervised learning approaches may also be employed.

Figure 1:
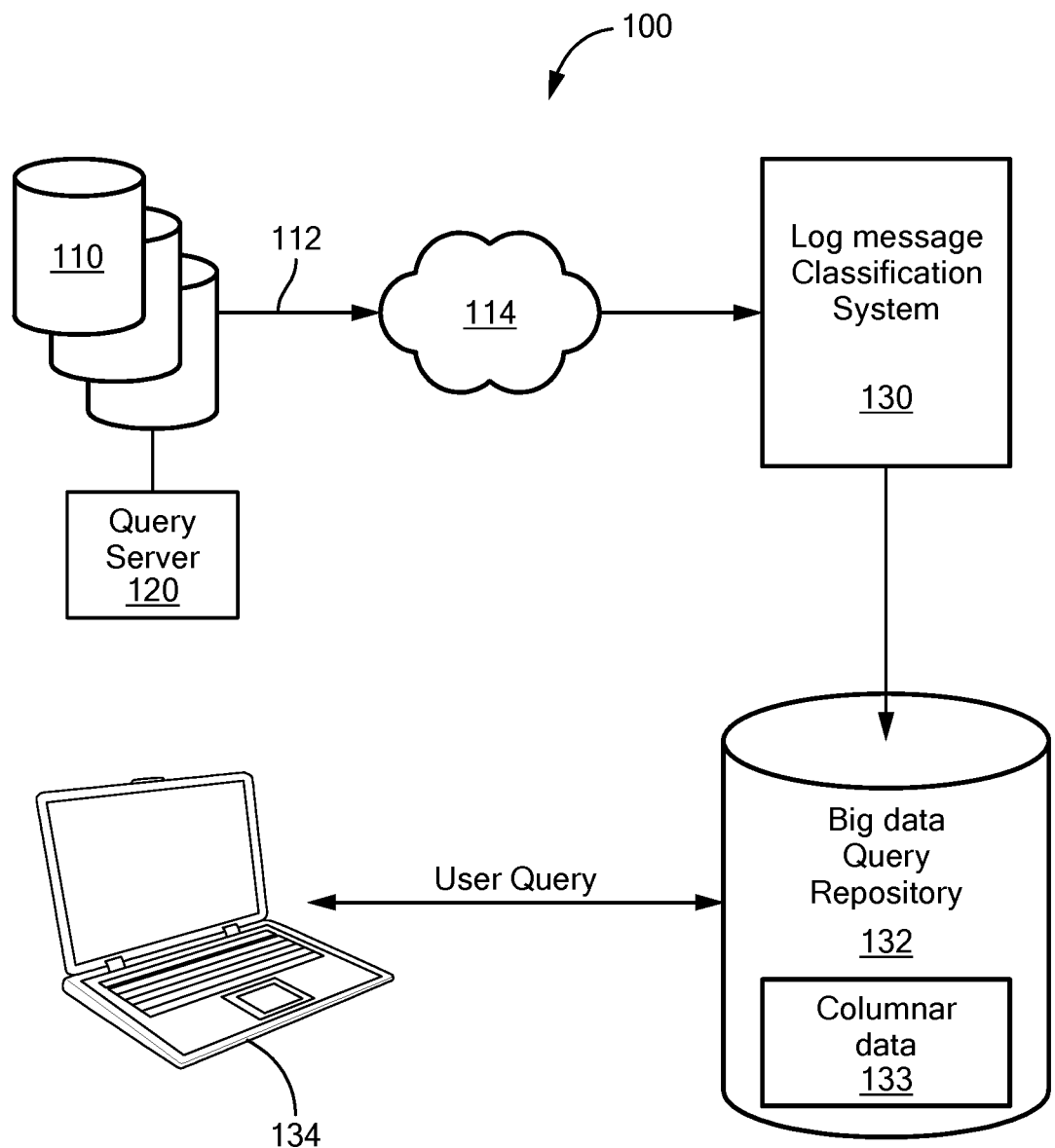
FIG. 1 is a context diagram of a message processing and query environment suitable for use with configurations herein.

FIG. 1 is a context diagram of a message processing and query environment suitable for use with configurations herein. Referring to FIG. 1, in an information processing environment 100, a plurality of repositories 110 support a query or transaction server 120 responsive to user requests. Database interactions with the repositories 100 generate a stream 112 of log messages, received via a network 114 by a log message classification system 130. The log message classification system 130 organizes the received log messages as discussed below, and provides the results to a query repository 132. The query repository 132 is responsive to user queries from a user device 134, such as regarding database performance, recurring errors, and other messages which emanate from the repository 110. The query repository 132 is adapted for vast, sparse data, commonly known as "bigdata," as while sparse, it maintains data for longevity and expedient access when needed. The repository may employ a columnar data arrangement 133 for facilitating subsequent access. The diagram of FIG. 1 is merely an exemplary interconnection of processing centers, as the modern proliferation of virtual machines and so-called "cloud computing" can prove elusive in defining a physical label or location to an actual computing entity performing a given processor task. Accordingly, an arrangement similar to FIG. 1, or a virtual equivalent, may suffice for implementing the principles herein.

In order to parse an incoming log message and identify its fields for inferring its real meaning, a format needs to be identified. In a particular configuration, the system herein classifies a log message into one of N known classes of log message formats, using a random forest. The log message classification system 130 includes a classifier that consults the random forest for effecting a comparison with previous log messages, determines, based on the comparison, if the input string matches an existing group, and if so directs the input string to the parser corresponding to the determined group, and computes a confidence indicative of a probability that the directed input string belongs in the determined group. The group includes messages that share a known format for invoking a parser the expects that format. Messages may then be further parsed by a parser corresponding to the group.

In general, the input strings defining a log message are generally composed of two parts:
1. Descriptive text, possibly containing multiple lines
2. Metadata about the message, composed of a set of key/value pair.

Figure 2:
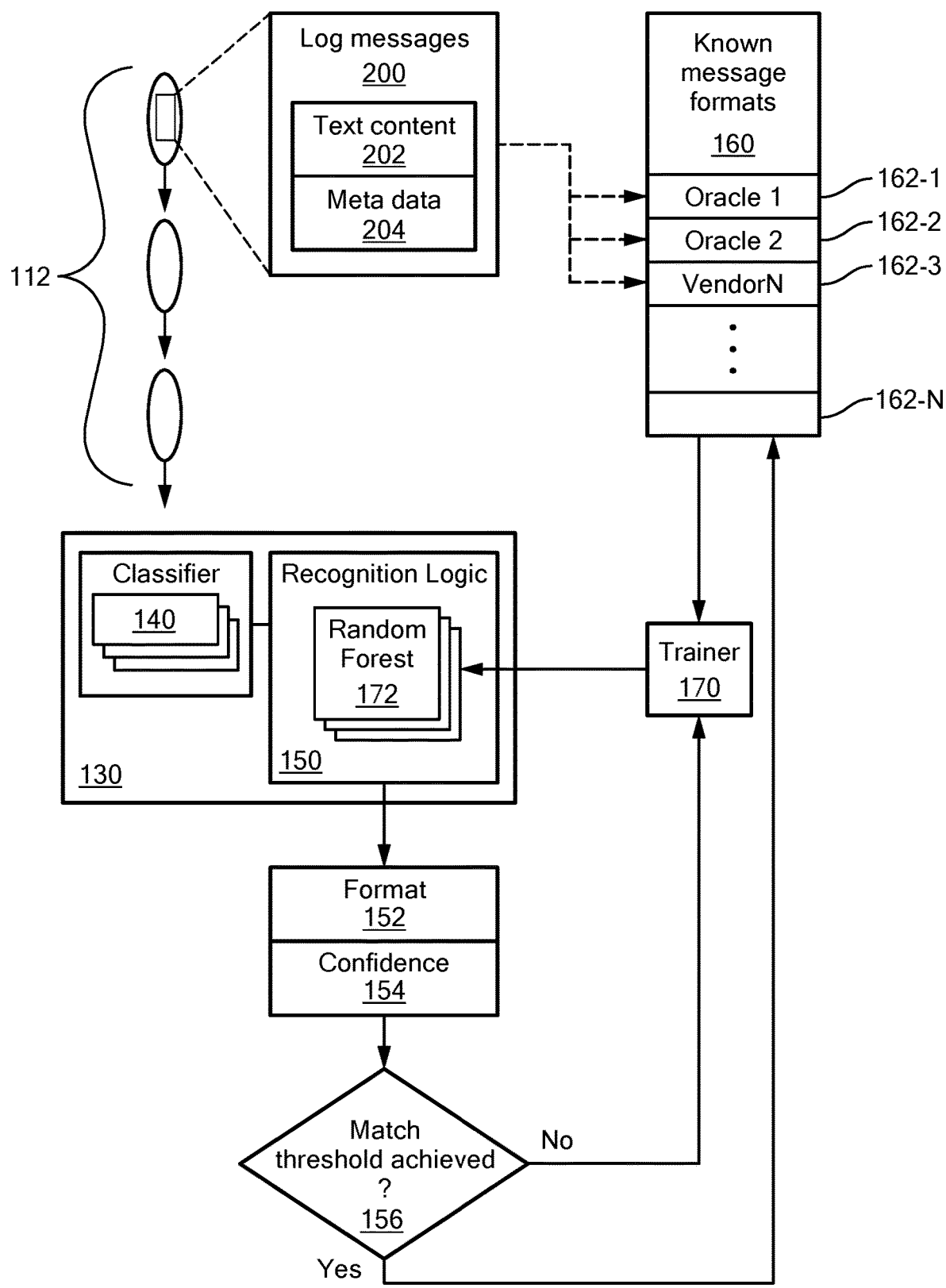
FIG. 2 is a dataflow diagram of messages received in the environment of FIG. 1.

Examples of metadata include:
 a. When was the message first received
 b. What computer generated the message
 c. Which organization sent the message for processing
 d. The file name where the message was found
 e. The IP port number the message was sent to
 f. The IP port number the message originated from
 g. The application that send the message
 h. The severity of the message FIG. 2 is a dataflow diagram of messages received in the environment of FIG. 1. Referring to FIGS. 1 and 2, the stream 112 of log messages arrives at the classification system 130 from a plurality of sources. Each message 200 in the stream 112 includes message content 202 and the metadata 204. The classification system 130 converts an input string defining the message 200 into the vector of tokens 140 by identifying a sequence of characters from the input string and mapping the sequence of characters to a numerical value corresponding to the identified sequence of characters, in which the sequence of characters typically appears in a plurality of the input strings. Log messages have many commonly recurring labels. Conversion to a token allows each label to be defined by a number to facilitate identical values across multiple messages, rather than consistently referencing a (possibly long) character sequence. Each token therefore represents a sequence of characters.

The input string is defined by a vector of tokens 140 received by the log message classification system 130, or classifier. Log messages 200 eventually are routed to one of a plurality of parsers representing known message formats 160. Software vendors of the software products emanating the messages define the message formats, and the parsers 162-1 . . . 162-N are configured to interpret corresponding messages.

The method of classifying log messages into groups indicative of a message format therefore includes receiving a vector of tokens based on an input string, such that each token is indicative of a character sequence, and invoking recognition logic 150 for comparing the vector of tokens to a set of group vectors. Each group vector defines a format of an input string. The format corresponds to a plurality of input strings in the group and readable by a parser corresponding to the group. Also computed is the confidence indicative of a probability that the directed input string belongs in the determined group.

Output from the classifier 130 includes a computed group, or format 152 and a computed confidence 154 from the recognition logic 150, and a determined match 156 for the computed group based on the computed confidence exceeding a predetermined confidence threshold. Above the predetermined confidence threshold, the message is mappable to the known message formats 160.

Below the predetermined confidence threshold, the classifier 130 creates a new group corresponding to a new format based on the vector of the unmatched input string. Creating a new group further includes constructing a set of features of the input string based on the input string and metadata, and assigning a value to each feature of the input string. After one or more new groups are required, the classifier invokes a trainer 170 to rebuild the recognition logic including the new format and new group. The classifier 130 may rebuild the recognition logic based on a frequency of unmatched input strings or other criteria.

The trainer 170 periodically rebuilds the recognition logic 150 based on a set of training input strings in a predetermined format corresponding to intended groups of the log messages. In the example configuration, the trainer 170 defines and rebuilds the recognition logic 150 using a random forest 172, however any suitable supervised learning algorithm or approach may be employed.

The trainer also generates an initial random forest 172 using input strings and a known format they correspond to. An initial random forest 172 may be derived from human classification or other arrangement that associates the message formats 162 with a corresponding parser. The trainer 172 may receive inputs of the message formats and known classifications from human observation, sets of accurate classification with the corresponding log messages depicting the format, or other source.

Figure 3:
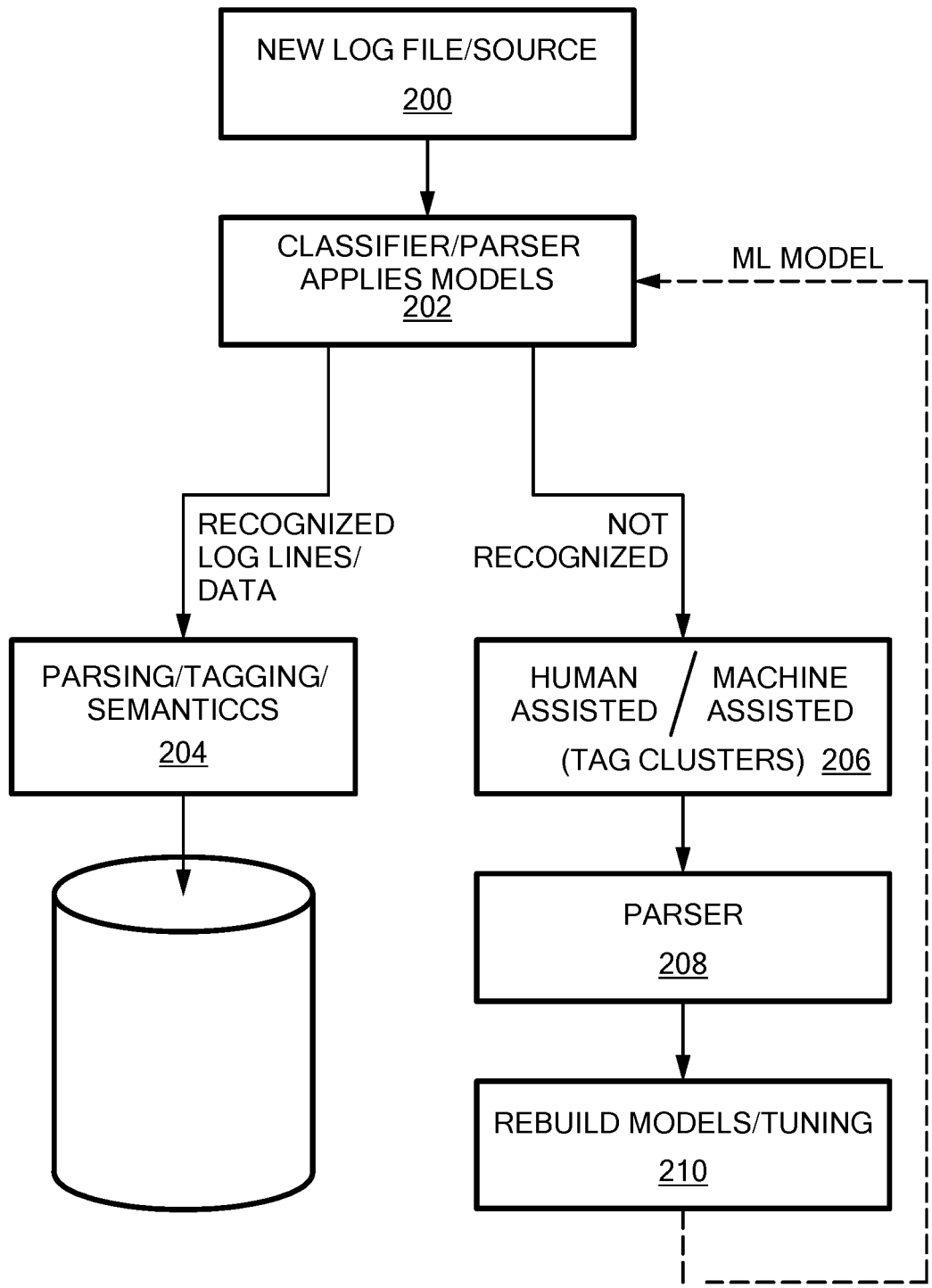
FIG. 3 is a flowchart of message processing according to the dataflow of FIG. 2.

FIG. 3 is a flowchart of message processing according to the dataflow of FIG. 2. Referring to FIGS. 1-3, the disclosed system is composed of two components:
 1) The classifier 130 that receives a stream of log messages 212, consults the random forest 172 and outputs a per message a decision indicative of the message format 152, or class and the confidence 154 of the decision.
 2) The trainer 170 that receives a stream of log messages and their correct format and periodically regenerates the random forest used by the classifier 130.

In FIG. 3, at step 300, a new log file arrives with a plurality of messages 200. The classifier 130 applies the model defined by the random forest 172 or other recognition logic 150, seeking recognition, as depicted at step 202. If the message 200 is recognized, control passes to step 204 for parsing. Otherwise, the message 200 is evaluated for modification of an existing group or creation of a new group at step 206 This may include manual human input for defining the message format, or may involve machine assisted modification or splitting of an existing group, discussed further below in FIGS. 4-6B. Parsing logic is defined for the previously unclassified message at step 208. Periodically, after a certain occurrence of unclassified messages, the trainer 150 rebuilds the random forest 172, as depicted at step 210.

Figure 4:
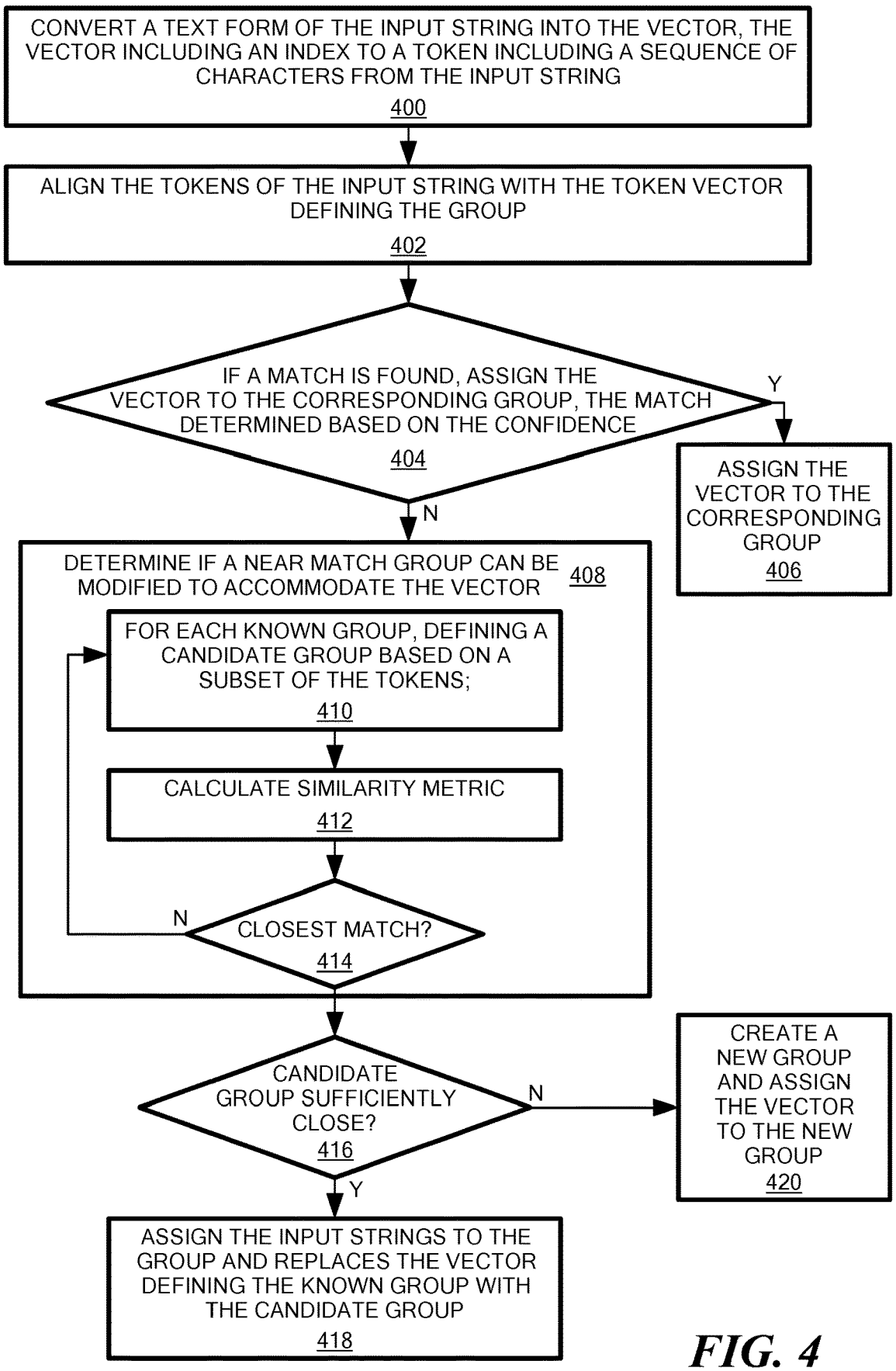
FIG. 4 shows greater detail of incoming message processing in the flowchart of FIG. 3.

FIG. 4 shows greater detail of unknown message processing in the flowchart of FIG. 3. In one particular configuration, the recognition logic is implemented in a model defined by a random forest and trained/regenerated using machine learning. The decision taken by the random forest 172 depends of values of features derived from the log message. A feature is expressed as a number. Relevant features include:

1. Format Dictionary Compliance

The model contains pre-prepared dictionaries—list of phrases, delimiters and features that are typical to a specific log format. For each dictionary, a feature is calculated as the percentage of the messages in the dictionary that are also in the message. This allows vendor specific keywords to be used in computing a dictionary feature of the plurality of features. The dictionary feature based on a set of phrases, such that each phrase corresponds to a format and, the feature defining a likelihood of the input string belonging to a particular format.

2. Message Length
3. Key dictionary

If the format has some kind of key-value pairing, similar to (1) but involving only the keys.

4. Messages almost always contain a timestamp from variety of formats. A feature contains which of the possible timestamp format was used (0 or 1 for each of the possible formats).

5. Message structures

For each message structure, the feature value is 1 if the message has that structure or 0 if it does not. E.g. for the XML structure, the feature will be valued 1 if the message can be parsed as XML and 0 if it cannot. Possible message structures are: CSV, XML, JSON, CEF, LEEF, YAML, key-value pairs, (and more)

6. Number of lines in the message
7. Values of the message metadata. For example, using the metadata fields above:

a. 1 if the message was generated by a specific computer, 0 if not b. 1 if the message was sent by a specific organization, 0 if not c. 1 if the message came from a specific log file, 0 if not d. The IP port number the message was sent to e. 1 if the message came from a specific application, 0 if not 8. Features are constructed from an input document as a frequency of the vocabulary entries in the document, normalized.

In operation, the classifier 130 operates by waiting for data to arrive on an HTTP port in a GET REST request and replies with a GET reply. The trainer 170 waits for data to arrive with PUT HTTP REST request. The random forest 172 may be saved in a file and, once replaced with better trained forest using the trainer 170, saved for further investigation in a historical forest directory. Decisions of the random forest 172 with a certainty below a user-configurable number are saved so that a human can inspect and enter the correct classification using the trainer so that the system improves with time. This involves periodically regenerating the recognition logic 150 when an input message 200 cannot be recognized by the recognition logic and associated with an existing message format 162 and parser. Correct matching is also achieved by splitting groups as now discussed with respect to FIG. 4

FIG. 4 shows greater detail of incoming message processing in the flowchart of FIG. 3. Referring to FIGS. 2-4, upon receiving an input string representing a new message 200, the classifier 130 converting a text form of the input string into a vector, such that the vector includes an index to a token including a sequence of characters from the input string, as depicted at step 400. The classifier attempts to matching the vector to known groups of previously identified input strings, as shown at step 402.

FIG. 4 shows the group matching by aligning the tokens of the input string with the token vector defining the group, as in step 402. Matching includes determining, for the sequence of tokens defined by vectors in the group, if there is a matching, continuous non-overlapping sequential subsequence of tokens in the vector generated for the input string.

Figure 5:
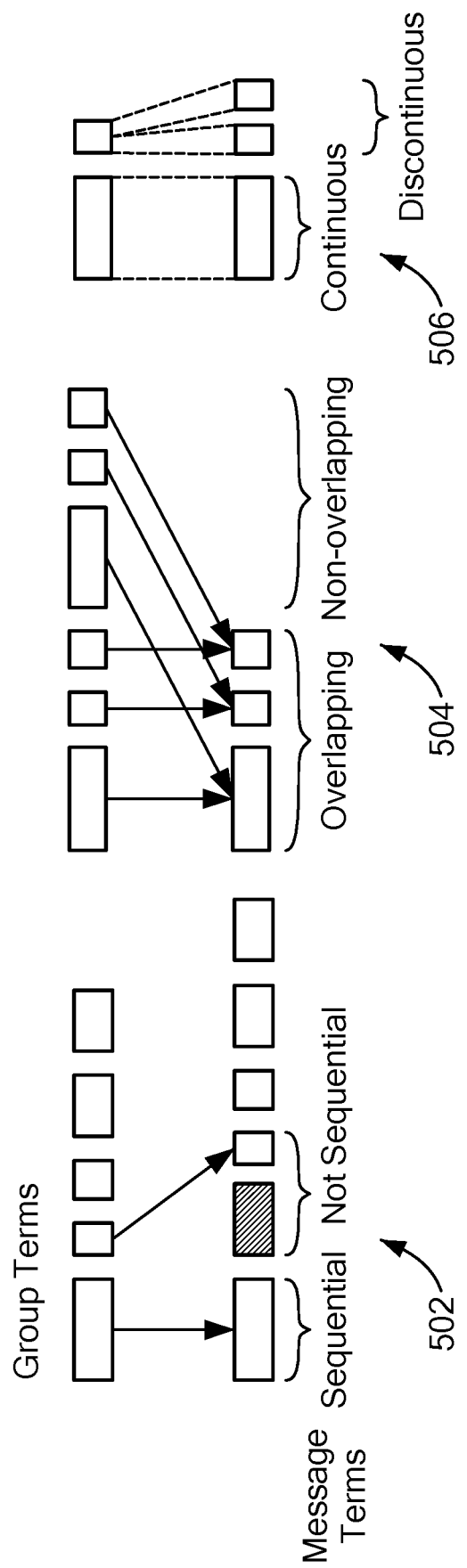
FIG. 5 shows matching of incoming messages to groups in the flowchart of FIG. 4.

Referring to FIG. 5, token match criteria for sequential 502, non-overlapping 504, and continuous 506 tokens are disclosed.

Continuing to refer to FIGS. 3-5, at step 404, a check is performed on the confidence 154 of the matching through the random forest 172. if a match is found, the classifier 130 assigns the vector to the corresponding group, in which the match is determined based on the confidence 154, as depicted at step 406.

if a match is not found, the classifier 130 determines if an existing group is a near match, and if so, determines if the near match group can be modified to accommodate the vector, as shown at step 408. Matching the known groups further includes, for each known group, defining a candidate group based on a subset of the tokens, and calculating similarity metrics between the input string vector and the candidate group, as depicted at step 410.

Defining the candidate group further includes determining a tail of the input string corresponding to tokens, the tail being a set of tokens in a latter portion of the input string, such that the latter portion is based on a last input string token matching the candidate group. At step 412, a calculated similarity is employed for comparing the calculated similarity of the input string to the known group and the candidate group for determining a metric. The metric is based on characters, tokens and terms of the candidate group to the known group, a size of the input string represented in the candidate group, and the terms of the known group also represented in the candidate group. Tail matching is shown further below in FIGS. 6A and 6B. Based on the highest calculated similarity, a closest match is determined at step 414, and control reverts to step 410 to refine the closest match.

For the candidate group with the greatest similarity calculated at step 412, the classifier 130 compares the calculated similarity metric to an inclusion threshold at step 416. The group with the closest similarity needs to be evaluated to determine if it can be modified to accommodate the new input string and all previous input strings assigned to the group. The classifier 130 assigns, if the calculated similarity is within the threshold, the input string to the group and replaces the vector defining the known group with the candidate group, as shown at step 418. Otherwise, the classifier creates a new group and assign the vector to the new group, as depicted at step 20.

Replacing the known group with the candidate group based on a match within the threshold further includes determining a subset of tokens in the tail of the input string having a best match to the candidate group, such that the subset of tokens is based on a string common to both vectors. A new vector is generated encompassing the input string and all current strings defining the known group. The classifier 130 defines the generated new vector as the known group including the "close match" input string.

Figure 6A:
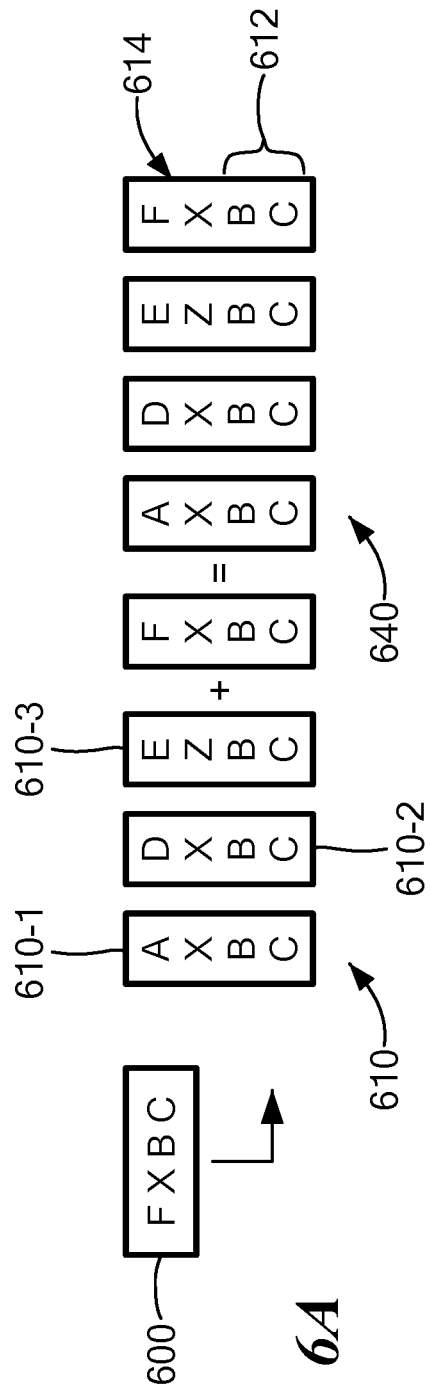
FIGS. 6A-6B shows a diagram of group creation according to the flowchart of FIG. 4.
Figure 6B:
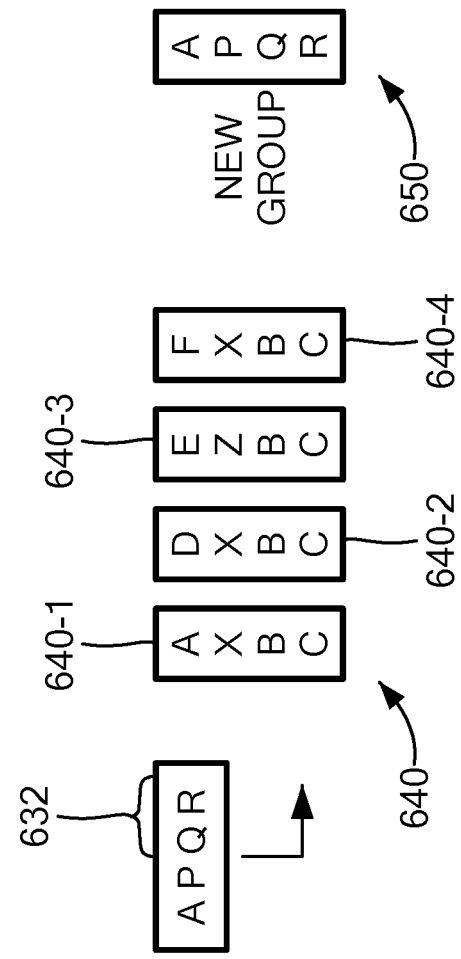

FIGS. 6A-6B show a diagram of group creation according to the flowchart of FIGS. 4 and 5, depicting the tail matching and candidate group generation. Referring to FIG. 6A, a new input string 200 arrives, defined by vector 600. A candidate group 610 includes vectors 610-1, 610-2 and 610-3, and purported addition 600. All 3 group vectors 610 and the new vector 600 contain the tail 612 "B C" in the last two positions. A second position 614 also has value X matching 2 of the 3 current group vectors 610. Vector 600 is added to group 610 to form group 640, based on a match on the tail.

In FIG. 6B, a new input message 200 is represented by vector 630. Existing group 640 includes vectors 640-1 . . . 640-4. The tail 632 of message 630 does not match any in group 640; in fact, only the first position A matches one vector 640-1. A new group 650 is created.

This matching is exemplary, and the actual degree of matching that defines the inclusion threshold and/or when a new group is mandated will vary based on the definition of the random forest 172 or similar recognition logic 150.

Figure 7:
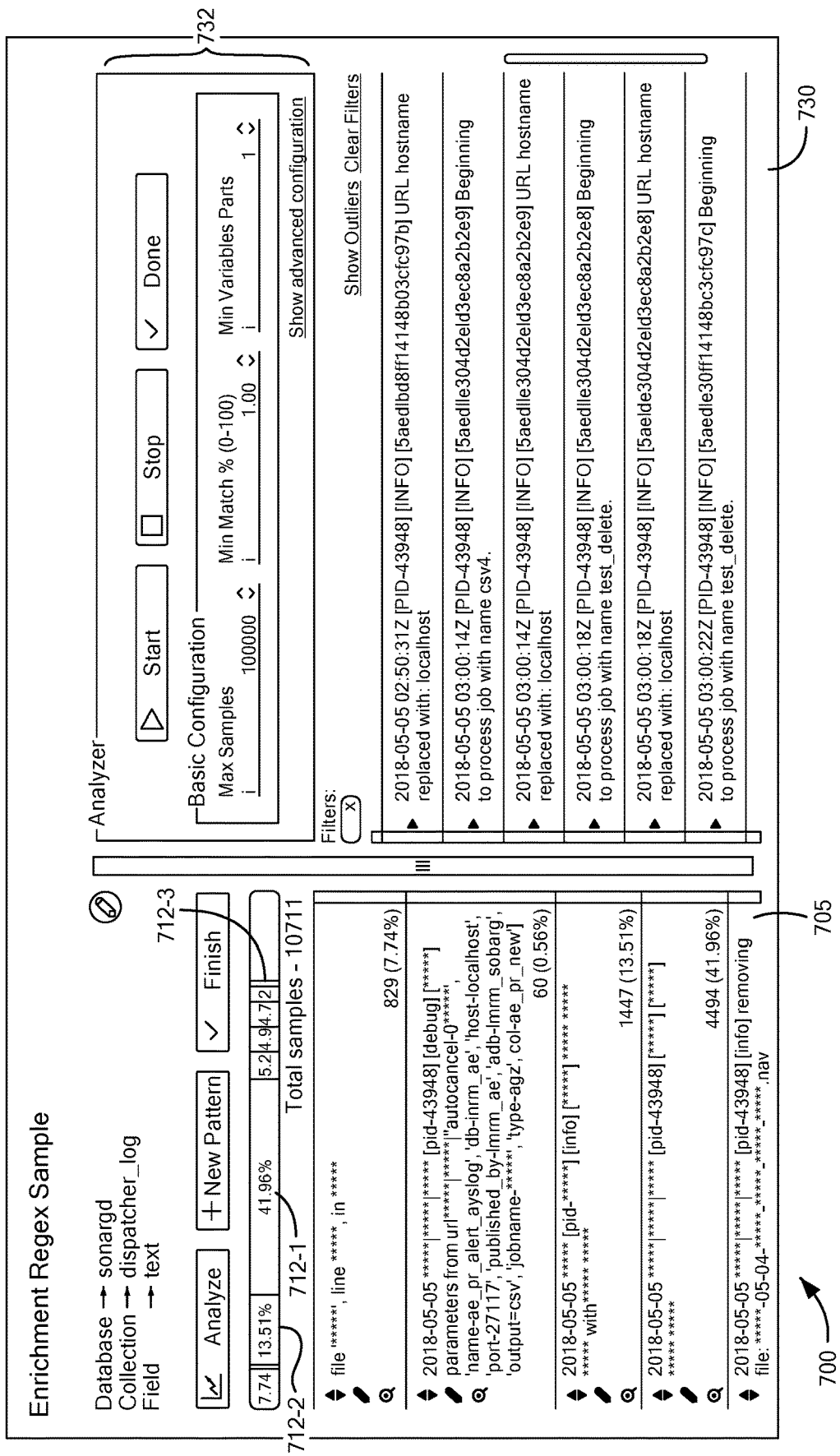
FIG. 7 shows a Graphical User Interface (GUI) for message processing and group selection as in FIG. 2.

FIG. 7 shows a Graphical User Interface (GUI) screen 700 for message processing and group selection as in FIG. 2. In the example arrangement, an operator GUI depicts a group distribution and proportion graph 710. Incoming log messages 200 appear in message window 705, showing the input text received. The proportion graph shows a colored bar length 712-1 . . . 712-3 proportional to the quantity of messages that fall into each group. Group 712-1 is seen as the largest portion. Group 712-2 is the second largest, and group 712-3 represents one of the smaller proportions of received messages. A key bar 720 beside each message matches the color of the group 712 designation. Normalized window 730 shows the messages in a tokenized form based on the token identification. Statistical controls allow filtering and reporting on the message statistics.

Figure 8:
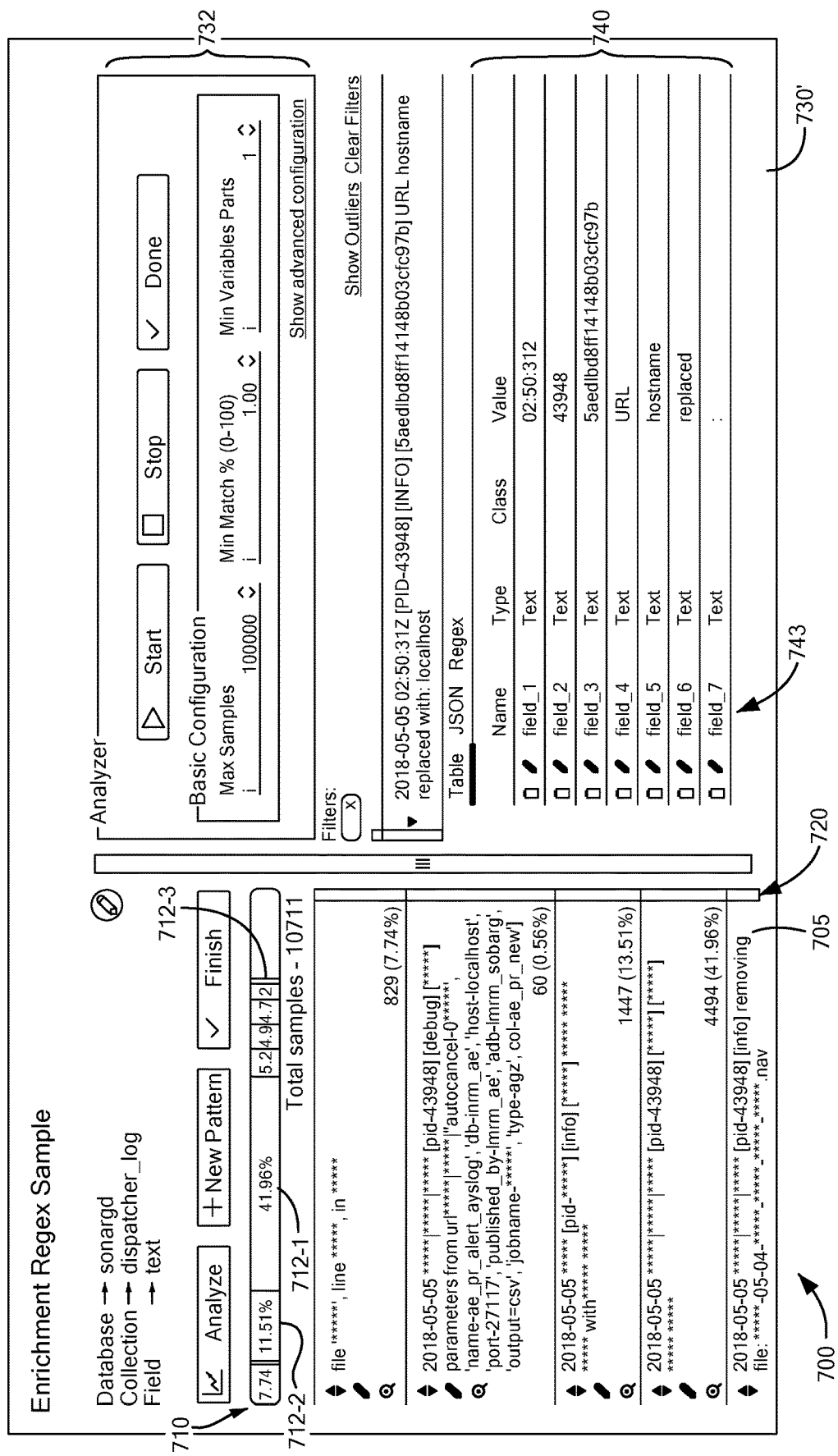
FIG. 8 shows a result of token parsing from a message received in FIG. 6.

FIG. 8 shows a result of token parsing from a message received in FIG. 6. Referring to FIGS. 7 and 8, a field decomposition view 740 lists the individual token fields 742 extracted from the message.

Following parser identification and field decomposition to generate a normalized form of the messages, the stream is transmitted to a query repository 132 (FIG. 1) for user query availability of the log files. Each log file or similar structure may represents a collection of documents containing unstructured data, and stored in a columnar format as disclosed in copending U.S. patent application Ser. No. 14/304,497, filed Jun. 13, 2014, entitled "COLUMNAR STORAGE AND PROCESSING OF UNSTRUCTURED DATA," incorporated herein by reference in entirety.

An initial training similar to the retraining forms the random forest 172. This may include training the recognition logic 150 using a training set of input strings in an expected format of the group and parser the input strings in the group correspond to. This initial training set (or retraining set) defines each of the group vectors in the recognition logic 150, such that the recognition logic 150 is based on a known set of vectors and corresponding input strings defining each group of a plurality of groups.

In an example arrangement, training the recognition logic may involve receiving a plurality of input strings, and for each input string:
  i: determining a plurality of features of the input string;
  ii: assigning a value to the feature;
  iii: comparing the values of corresponding features in a plurality of input strings for determining a set of related input strings; and
  iv: designating the format of the set of the related input strings as a group responsive to a common parser, such that the group is defined by a token vector defining the set of the related input strings. Other suitable approaches may be used for training or for alternate representations of the random forest 172 implementation.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method of classifying log messages into groups indicative of a message format, comprising:
  receiving a vector of tokens based on an input string, each token indicative of a character sequence based on an index;
  invoking recognition logic for comparing the vector of tokens to a set of group vectors, each group vector defining a format of an input string, the format corresponding to a plurality of input strings in a group and readable by a parser corresponding to the group;
  receiving a computed group and a computed confidence from the recognition logic
  determining a match for the computed group based on the computed confidence exceeding a predetermined confidence threshold, and if so,
    directing the input string to the parser corresponding to the matching computed based on the computed confidence indicative of a probability that the directed input string belongs in the determined group;
  and if not,
    creating a new group corresponding to a new format based on the vector of the unmatched input string; and
    periodically rebuilding the recognition logic based on a set of training input strings in a predetermined format corresponding to intended groups of the log messages.

2. The method of claim 1 wherein creating a new group further comprising:

constructing a set of features of the input string based on the input string and metadata of the input string;

assigning a value to each feature of the input string; and rebuilding the recognition logic including the new format and new group.

3. The method of claim 1 further comprising computing a confidence indicative of a probability that the directed input string belongs in the determined group.

4. The method of claim 3 further comprising rebuilding the recognition logic based on a frequency of unmatched input strings.

5. The method of claim 1 further comprising training the recognition logic using a training set of input strings based on input for specifying known classifications of input strings in an expected format of the group and parser the input strings in the group correspond to.

6. The method of claim 1 further comprising converting the input string into the vector of tokens by identifying a sequence of characters from the input string and mapping the sequence of characters to a numerical value corresponding to the identified sequence of characters, the sequence of characters appearing in a plurality of input strings.

7. The method of claim 6 wherein the vector of tokens is based on a series of character sequences appearing in the input string, each character sequence corresponding to a token.

8. The method of claim 1 further comprising defining each of the group vectors in the recognition logic, the recognition logic based on a known set of vectors and corresponding input strings defining each group of a plurality of groups.

9. The method of claim 1 further comprising periodically regenerating the recognition logic when an input message cannot be recognized by the recognition logic and associated with an existing message format and parser.

10. The method of claim 1 further comprising training the recognition logic, the recognition logic receiving input defining a plurality of input strings and an indication of a corresponding parser indicative of a group, and for each input string:
  i: determining a plurality of features of the input string;
  ii: assigning a value to the feature;
  iii: comparing the values of corresponding features in a plurality of input strings for determining a set of related input strings; and
  iv: designating the format of the set of the related input strings as a group responsive to a common parser, the group defined by a token vector defining the set of the related input strings.

11. The method of claim 9 further comprising computing a dictionary feature of the plurality of features, the dictionary feature based on a set of phrases, each phrase corresponding to a format and, the feature defining a likelihood of the input string belonging to a particular format.

12. The method of claim 1 further comprising defining and rebuilding the recognition logic using a random forest, further comprising generating an initial random forest based on inputs representing known classifications of input strings and the corresponding parser, and defining a training set including the vectors of the known classifications.

13. A method of classifying log messages into groups indicative of a message format, comprising:
  receiving a vector of tokens based on an input string, each token indicative of a character sequence;
  invoking recognition logic for comparing the vector of tokens to a set of group vectors, each group vector defining a format of an input string, the format corresponding to a plurality of input strings in a group and readable by a parser corresponding to the group;
  determining, based on the comparison, if the input string matches an existing group, and if so,
    directing the input string to the parser corresponding to the determined group, and computing a confidence indicative of a probability that the directed input string belongs in the determined group;
  and if not,
    creating a new group corresponding to a new format based on the vector of the unmatched input string; and
    periodically rebuilding the recognition logic based on a set of training input strings in a predetermined format corresponding to intended groups of the log messages;
  further comprising matching the input string by:
    converting a text form of the input string into the vector, the vector including an index to a token including a sequence of characters from the input string;
    matching the vector to known groups of previously identified input strings;
    if a match is found, assigning the vector to the corresponding group, the match determined based on the confidence;
    if a match is not found, determining if an existing group is a near match, and if so,
      determining if the near match group can be modified to accommodate the vector;
      otherwise, creating a new group and assigning the vector to the new group.

14. The method of claim 13 wherein matching includes determining, for the sequence of tokens defined by vectors in the group, if there is a matching, continuous non-overlapping sequential subsequence of tokens in the vector generated for the input string.

15. The method of claim 13 wherein matching the known groups further includes:
  for each known group, defining a candidate group based on a subset of the tokens;
  calculating similarity metrics between the input string vector and the candidate group;
  for the candidate group with the greatest similarity, compare the calculated similarity metric to an inclusion threshold;
  assigning, if the calculated similarity is within the threshold, the input string to the group and replace the vector defining the known group with the candidate group; and
  if not, creating a new group based on the input string.

16. The method of claim 15 wherein replacing the known group with the candidate group based on a match within the threshold further comprises:
  determining a subset of tokens in the tail of the input string having a best match to the candidate group, the subset of tokens based on a string common to both vectors;
  generating a new vector encompassing the input string and all current strings defining the known group; and
  defining the generated new vector as the known group including the input string.

17. The method of claim 13 wherein defining the candidate group further includes determining a tail of the input string corresponding to tokens, the tail being a set of tokens in a latter portion of the input string, the latter portion based on a last input string token matching the candidate group.

18. The method of claim 17 wherein determining a match of the latter portion further comprises comparing the calculated similarity of the input string to the known group and the candidate group for determining a metric based on characters, tokens and terms of the candidate group to the known group, a size of the input string represented in the candidate group, and the terms of the known group also represented in the candidate group.

19. A computer program embodying program code on a non-transitory medium that, when executed by a processor, performs steps for implementing a method of classifying log messages into groups indicative of a message format, the method comprising:

receiving a vector of tokens based on an input string, each token indicative of a character sequence;

invoking recognition logic for comparing the vector of tokens to a set of group vectors, each group vector defining a format of an input string, the format corresponding to a plurality of input strings in a group and readable by a parser corresponding to the group;

determining, based on the comparison, if the input string matches an existing group, and if so, directing the input string to the parser corresponding to the determined group, and computing a confidence indicative of a probability that the directed input string belongs in the determined group;

and if not, creating a new group corresponding to a new format based on the vector of the unmatched input string, creating a new group further comprising:

constructing a set of features of the input string based on the input string and metadata of the input string;

assigning a value to each feature of the input string; and rebuilding the recognition logic including the new format and new group further comprising matching the input string by:

converting a text form of the input string into the vector, the vector including an index to a token including a sequence of characters from the input string;

matching the vector to known groups of previously identified input strings;

if a match is found, assigning the vector to the corresponding group, the match determined based on the confidence;

if a match is not found, determining if an existing group is a near match, and if so, determining if the near match group can be modified to accommodate the vector;

otherwise, creating a new group and assigning the vector to the new group.

* * * * *